(12) United States Patent
Yang et al.

(10) Patent No.: US 9,191,572 B2
(45) Date of Patent: Nov. 17, 2015

(54) IMAGE SENSOR AND IMAGE PROCESSING APPARATUS USING THE SAME

(71) Applicant: Samsung Electronics Co., Ltd., Suwon-si (KR)

(72) Inventors: Han Yang, Yongin-si (KR); Kwang-hyun Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 214 days.

(21) Appl. No.: 13/760,556

(22) Filed: Feb. 6, 2013

(65) Prior Publication Data

US 2013/0201361 A1 Aug. 8, 2013

(30) Foreign Application Priority Data

Feb. 6, 2012 (KR) .......................... 10-2012-0011798

(51) Int. Cl.
| | |
|---|---|
| H04N 5/228 | (2006.01) |
| H04N 5/225 | (2006.01) |
| H04N 5/232 | (2006.01) |
| H04N 5/378 | (2011.01) |

(52) U.S. Cl.
CPC ........... *H04N 5/23229* (2013.01); *H04N 5/378* (2013.01)

(58) Field of Classification Search
CPC . H04N 5/374; H04N 5/3742; H04N 5/37452; H04N 5/378; H04N 5/3658; H04N 3/155; H04N 5/37457; H04N 5/357; H04N 5/3575; H03M 1/56; H01L 27/14643; H01L 27/14603; H01L 27/14609; G01J 1/44

USPC .......................... 348/138, 222.1, 333.11, 308
See application file for complete search history.

(56) References Cited

U.S. PATENT DOCUMENTS

| | | | | |
|---|---|---|---|---|
| 6,753,912 | B1 | 6/2004 | Wayne | |
| 6,803,958 | B1 * | 10/2004 | Wang | ............................. 348/308 |
| 2005/0168602 | A1 * | 8/2005 | Sumi et al. | ..................... 348/294 |
| 2008/0239124 | A1 * | 10/2008 | Mori et al. | ..................... 348/308 |

FOREIGN PATENT DOCUMENTS

| | | |
|---|---|---|
| EP | 1 956 715 A1 | 8/2008 |
| KR | 1020020046957 A | 6/2002 |
| KR | 1020100050909 A | 5/2010 |

* cited by examiner

*Primary Examiner* — Trung Diep
(74) *Attorney, Agent, or Firm* — Myers Bigel Sibley & Sajovec, PA

(57) ABSTRACT

An image sensor senses object information and converts the sensed object information into an electrical signal. An image processing apparatus uses the image sensor. The image sensor includes a column signal line connected to output terminals of a plurality of pixel sensors, a comparator circuit configured to output a signal corresponding to a comparison result of a signal output to the column signal line and a reference signal, an ADC circuit configured to convert an analog signal corresponding to an optical signal sensed by the pixel sensor selected from the plurality of pixel sensors connected to the column signal line into digital data based on the signal output from the comparator circuit and, a load circuit connected in series to the comparator circuit between the column signal line and a ground terminal, wherein the load circuit is configured as a common load device of the plurality of pixel sensors connected to the column signal line and the comparator circuit.

17 Claims, 13 Drawing Sheets

IMAGE SENSOR AND IMAGE PROCESSING APPARATUS USING THE SAME

CROSS-REFERENCE TO RELATED APPLICATIONS

This application claims the benefit of Korean Patent Application No. 10-2012-0011798, filed on Feb. 6, 2012, in the Korean Intellectual Property Office, the disclosure of which is incorporated herein in its entirety by reference.

BACKGROUND

The inventive concept relates to a sensor for sensing a signal, and, more particularly, to an image sensor for sensing object information and converting the sensed object information into an electrical signal and an image processing apparatus using the image sensor.

An example of an image sensor is a complementary metal oxide semiconductor (CMOS) image sensor. The CMOS image sensor is a device for converting an optical image into an electrical signal, and may be applied to electronic products, such as a digital camera, a cellular phone, and the like. As electronic products become slimmer, research into minimization of the CMOS image sensor and reduction of power consumption is needed.

SUMMARY

The inventive concept may provide an image sensor for reducing a size of a product and power consumption thereof.

The inventive concept may also provide an image processing apparatus using an image sensor for reducing a size of a product and power consumption thereof.

According to an aspect of the inventive concept, there is provided an image sensor including: a column signal line connected to output terminals of a plurality of pixel sensors; a comparator circuit configured to output a signal corresponding to a comparison result of a signal output to the column signal line and a reference signal; an analog/digital conversion (ADC) circuit configured to convert an analog signal corresponding to an optical signal sensed by the pixel sensor selected from the plurality of pixel sensors connected to the column signal line into digital data based on the signal output from the comparator circuit; and a load circuit connected in series to the comparator circuit between the column signal line and a ground terminal, wherein the load circuit is configured as a common load device of the plurality of pixel sensors connected to the column signal line and the comparator circuit.

The comparator circuit may include a transistor, wherein the reference signal is applied to a gate terminal of the transistor, the column signal line is connected to a first terminal of the transistor, and the load circuit is connected to a second terminal of the transistor.

The transistor may include a PMOS transistor.

The comparator circuit may include a transistor, a capacitor, and a switch, wherein the reference signal is applied to a first terminal of the capacitor, a gate terminal of the transistor and a first terminal of the switch are connected to a second terminal of the capacitor, the column signal line is connected to a first terminal of the transistor, and a second terminal of the switch and the load circuit are connected to a second terminal of the transistor.

The switch may be turned on during a first section before a correlated double sampling (CDS) process is performed and may be turned off during sections other than the first section.

The load circuit may include an active load circuit.

The reference signal may include a signal having a ramp waveform.

The ADC circuit may include: a counter circuit configured to generate the digital data as a counting value corresponding to a difference in a length of double sampling sections determined according to the signal output from the comparator circuit based on the CDS process.

The counter circuit may generate the digital data by performing up-counting during one of the double sampling sections and performing down-counting during another double sampling section, or performing up-counting or down-counting during the double sampling sections and changing a digital data code of one of the double sampling sections through bit-inversion between the double sampling sections.

The image sensor may further include an amplification circuit between an output terminal of the comparator circuit and the ADC circuit.

The amplification circuit may include an inverter or an amplifier.

Each of the plurality of pixel sensors may include: a photoelectric conversion device configured to generate charges corresponding to an incident light; and a signal transfer circuit configured to transfer an electrical signal corresponding to the charges generated by the photoelectric conversion device to the column signal line.

The signal transfer circuit may include: a first transistor connected between the photoelectric conversion device and the first node and configured to transmit the charges accumulated in the photoelectric conversion device to the first node according to a first driving signal; a second transistor connected between the first node and a power voltage and configured to reset the charges charged in the first node according to a second driving signal; a third transistor connected between the first node and a second node and configured to transfer a signal sensed by the first node to the second node; and a fourth transistor connected between the second node and the column signal line and configured to transfer a signal of the second node to the column signal line according to a third driving signal.

According to another aspect of the inventive concept, there is provided an image processing apparatus including: an image sensor configured to convert an incident image signal into an electrical signal; and a processor configured to control an operation of the image sensor and post-processing a signal output from the image sensor, wherein the image sensor includes: a column signal line connected to output terminals of a plurality of pixel sensors; a comparator circuit configured to output a signal corresponding to a comparison result of a signal output to the column signal line and a reference signal; an analog/digital conversion (ADC) circuit configured to convert an analog signal corresponding to an optical signal sensed by the pixel sensor selected from the plurality of pixel sensors connected to the column signal line into digital data based on the signal output from the comparator circuit; and a load circuit connected in series to the comparator circuit between the column signal line and a ground terminal, wherein the load circuit is configured to operate as a common load device of the plurality of pixel sensors connected to the column signal line and the comparator circuit.

The comparator circuit may include a transistor, wherein a reference signal having a ramp waveform is applied to a gate terminal of the transistor, the column signal line is connected to a first terminal of the transistor, and the load circuit is connected to a second terminal of the transistor.

According to another aspect of the inventive concept, an image sensor comprises a column signal line connected to output terminals of a plurality of pixel sensors and configured to generate a column signal line output signal, a comparator circuit configured to output a comparison result signal corresponding to a comparison of the column signal line output signal and a reference signal, and a load circuit connected to the comparator circuit between the column signal line and a ground terminal and configured as a common load device of the plurality of pixel sensors connected to the column signal line and the comparator circuit.

The comparator circuit comprises a transistor, a gate terminal of the transistor receives the reference signal, the column signal line is connected to a first terminal of the transistor, and the load circuit is connected to a second terminal of the transistor.

The transistor may comprise a PMOS transistor.

The comparator circuit may comprise a transistor, a capacitor, and a switch, a first terminal of the capacitor receives the reference signal, a gate terminal of the transistor and a first terminal of the switch are connected to a second terminal of the capacitor, the column signal line is connected to a first terminal of the transistor, and a second terminal of the switch and the load circuit are connected to a second terminal of the transistor.

The switch may be in a turned on state during a first section before a correlated double sampling (CDS) process is performed and may be in a turned off during sections other than the first section.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
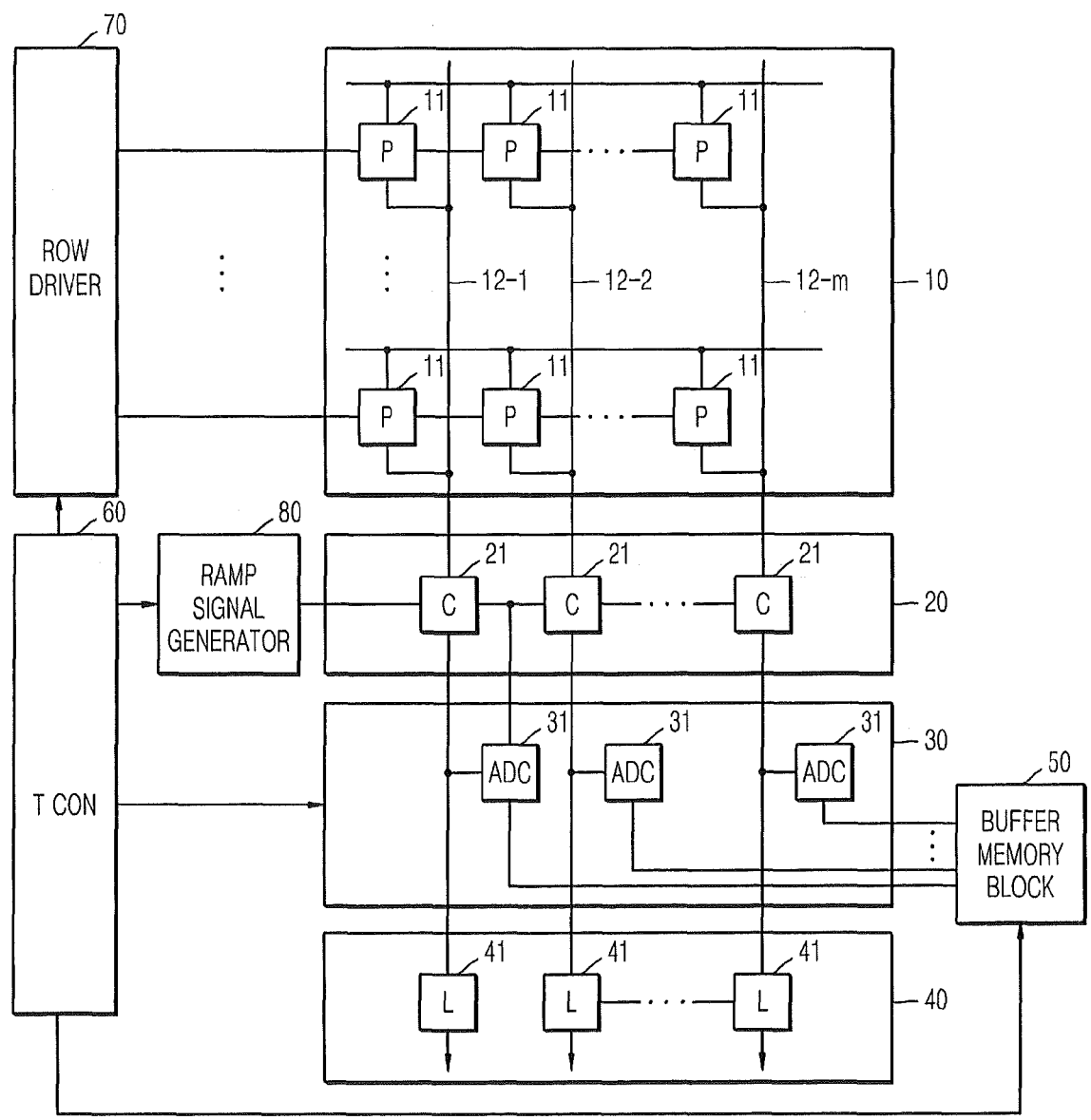
FIG. 1 is a block diagram of an image sensor, according to an embodiment of the inventive concept.

Hereinafter, the inventive concept will be described more fully with reference to the accompanying drawings, in which exemplary embodiments of the inventive concept are shown. The present inventive concept may, however, be embodied in many different forms and should not be construed as limited to the example embodiments set forth herein. Rather, these embodiments are provided so that this disclosure will be thorough and complete, and will fully convey the scope of the inventive concept to those of ordinary skill in the art. As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. It will be understood that when an element or layer is referred to as being "on," "connected to" or "coupled with" another element or layer, it can be directly on, connected or coupled with the other element or layer or intervening elements or layers may be present. In contrast, when an element is referred to as being "directly on," "directly connected to" or "directly coupled with" another element or layer, there are no intervening elements or layers present. In the drawings, like reference numerals denote like elements and the sizes or thicknesses of elements may be exaggerated for clarity of explanation.

The terms used in the present specification are merely used to describe particular embodiments, and are not intended to limit the inventive concept. An expression used in the singular encompasses the expression in the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined differently, all terms used in the description including technical and scientific terms have the same meaning as generally understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein. Expressions such as "at least one of," when preceding a list of elements, modify the entire list of elements and do not modify the individual elements of the list.

FIG. 1 is a block diagram of an image sensor 100, according to an embodiment of the inventive concept.

Referring to FIG. 1, the image sensor 100 includes a pixel sensor array 10, a comparator circuit block 20, an analog/digital conversion (ADC) circuit block 30, a load circuit block 40, a buffer memory block 50, a timing controller TCON 60, a row driver 70, and a ramp signal generator 80.

The pixel sensor array 10 includes a plurality of pixel sensors P 11 that are respectively connected to a plurality of column signal lines 12-1~12-m in a matrix shape. The comparator circuit block 20 includes a plurality of comparator circuits C 21 that are respectively connected to the column signal lines 12-1~12-m. The ADC circuit block 30 includes a plurality of ADC circuits 31. The ADC circuit block 30 includes at least one of the ADCs 31 for each of the column signal lines 12-1~12-m. The load circuit block 40 includes a plurality of load circuits L 41. The load circuit block 40 includes the single common load circuit L 41 for each of the column signal lines 12-1~12-m.

The detailed construction and operation of the image sensor 100, according to some embodiments of the inventive concept, will now be described below.

The pixel sensor array 10 is briefly referred to as a pixel array. The pixel sensor array 10 includes the plurality of pixel sensors P 11. The pixel sensors P 11 may include a plurality of color pixel sensors, for example, at least one red pixel sensor, at least one green pixel sensor, and at least one blue pixel sensor.

If the image sensor 100 is implemented as a 3D image sensor, the pixel sensors P 11 may further include at least one depth pixel sensor in addition to the color pixel sensors. The depth pixel sensor may generate optical charges corresponding to wavelengths of an infrared region.

The pixel sensor array 10 may include the plurality of column signal lines 12-1~12-m (m is a natural number). The pixel sensors P 11 that are arranged in a column direction may be respectively connected to the column signal lines 12-1~12-m.

Figure 2A:
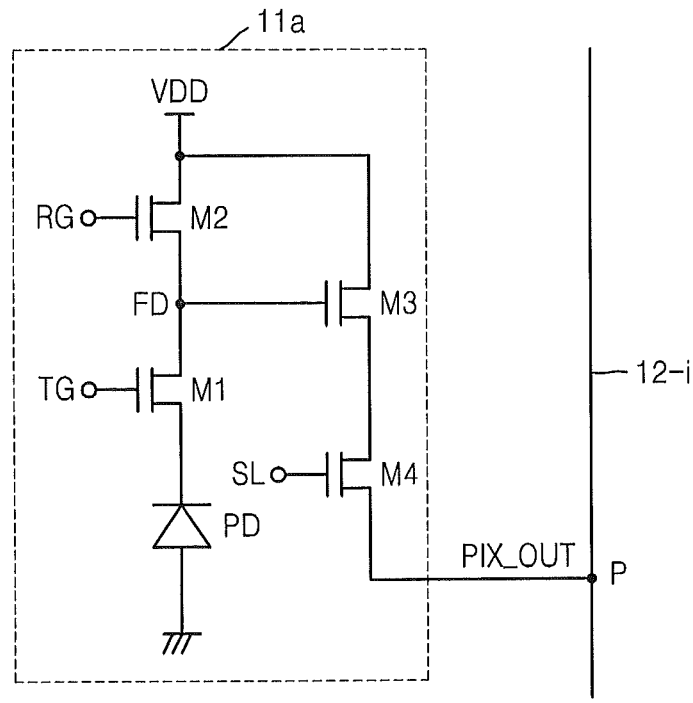
FIGS. 2A through 2C are exemplary circuit diagrams of pixel sensors of FIG. 1.
Figure 2B:
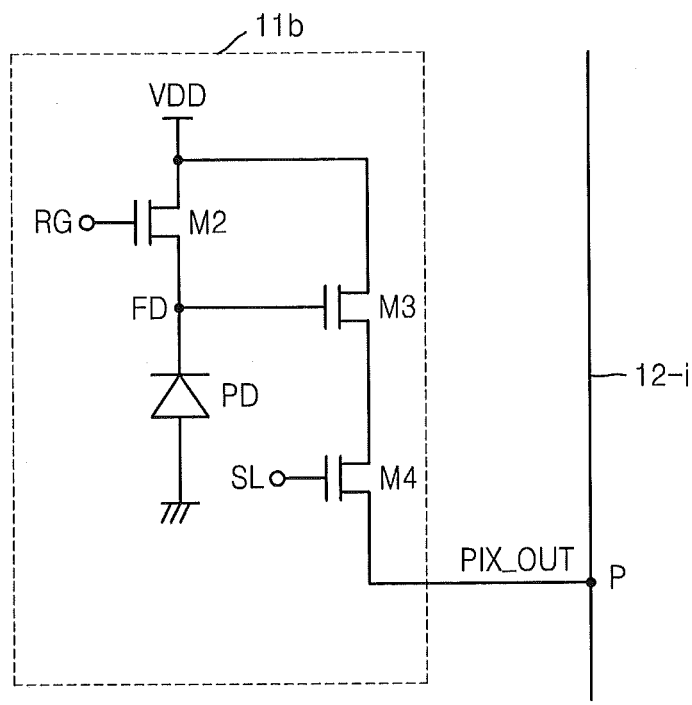
Figure 2C:
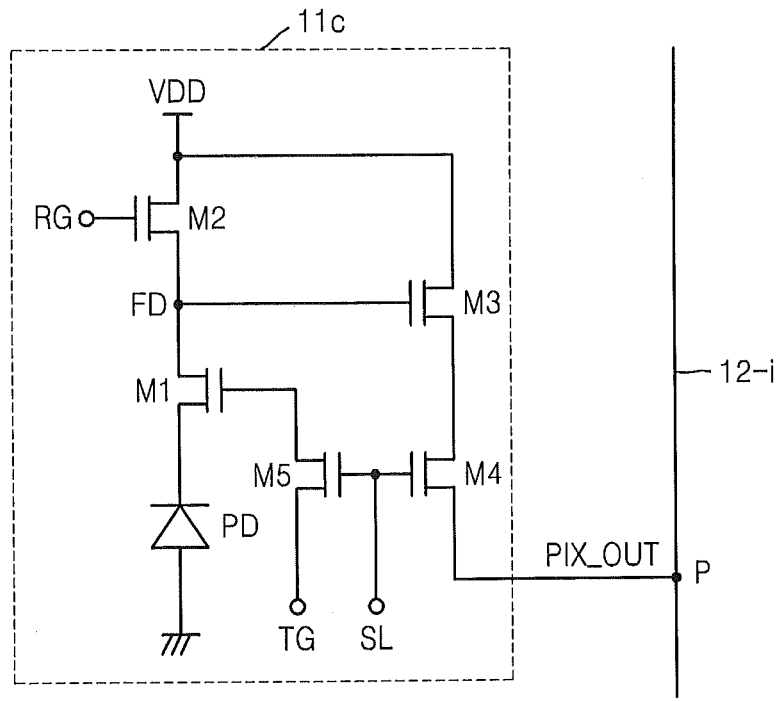

FIGS. 2A through 2C are exemplary circuit diagrams of the pixel sensors P 11 of FIG. 1.

Referring to FIG. 2A, a pixel sensor 11a according to an embodiment of the inventive concept may be implemented as one photoelectric conversion device PD and four transistors M1~M4.

The photoelectric conversion device PD that is an optical sensing device may be implemented as a photo diode, a photo transistor, a photo gate, or a pinned photo diode.

The photoelectric conversion device PD is connected between a floating diffusion node FD and a ground terminal and generates charges corresponding to an incident optical signal.

The transistor M2 is connected between a power voltage terminal VDD and the floating diffusion node FD and functions to emit charges stored in the floating diffusion node FD in response to a driving signal RG.

The transistor M1 is connected between an output terminal of the power voltage terminal VDD and the floating diffusion node FD and functions to transmit the optical charges generated by the photoelectric conversion device PD to the floating diffusion node FD in response to another driving signal TG.

The transistor M3 functions as a source follower buffer amplifier and may perform a buffering operation in response to the charges stored in the floating diffusion node FD.

A drain terminal of the transistor M4 is connected to a source terminal of the transistor M3, and a source terminal thereof is connected to a node P of the column signal line 12-i. Another driving signal SL is applied to a gate terminal of the transistor M4.

Accordingly, the transistor M4 may output a pixel signal PIX_OUT output from the transistor M3 to the column signal line 12-i in response to the driving signal SL.

Referring to FIG. 2B, a pixel sensor 11b according to another embodiment of the inventive concept may be implemented as the photoelectric conversion device PD and the three transistors M2~M4.

Referring to FIGS. 2A and 2B, the pixel sensor 11b of FIG. 2B has a structure in which the transistor M1 functioning as a transmission transistor is deleted.

Referring to FIG. 2C, a pixel sensor 11c according to another embodiment of the inventive concept may be implemented as the photoelectric conversion device PD and five transistors M1~M5. The driving signal TG for controlling an operation of the transistor M1 functioning as the transmission transistor is supplied to a gate of the transistor M1 through the transistor M5 that is turned on/off in response to the driving signal SL.

Referring to FIG. 1, the timing controller 60 generates control signals necessary for selecting the pixel sensors P 11 or outputting image signals sensed by the pixel sensors P 11. The timing controller 60 may control generation timing of a ramp signal necessary for performing a correlated double sampling (CDS) process and control output of data stored in the buffer memory block 50.

The row driver 70 outputs a plurality of driving signals necessary for controlling photoelectric conversion operations of the pixel sensors P 11 arranged in a row direction to the pixel sensor array 10 in response to the control signals. In this regard, the plurality of driving signals may include, for example, the driving signals RG, TG, and SL of FIG. 11. The plurality of driving signals may further include, for example, a driving signal AZP of FIG. 12. The driving signal AZP will be described in more detail below.

Figure 11:
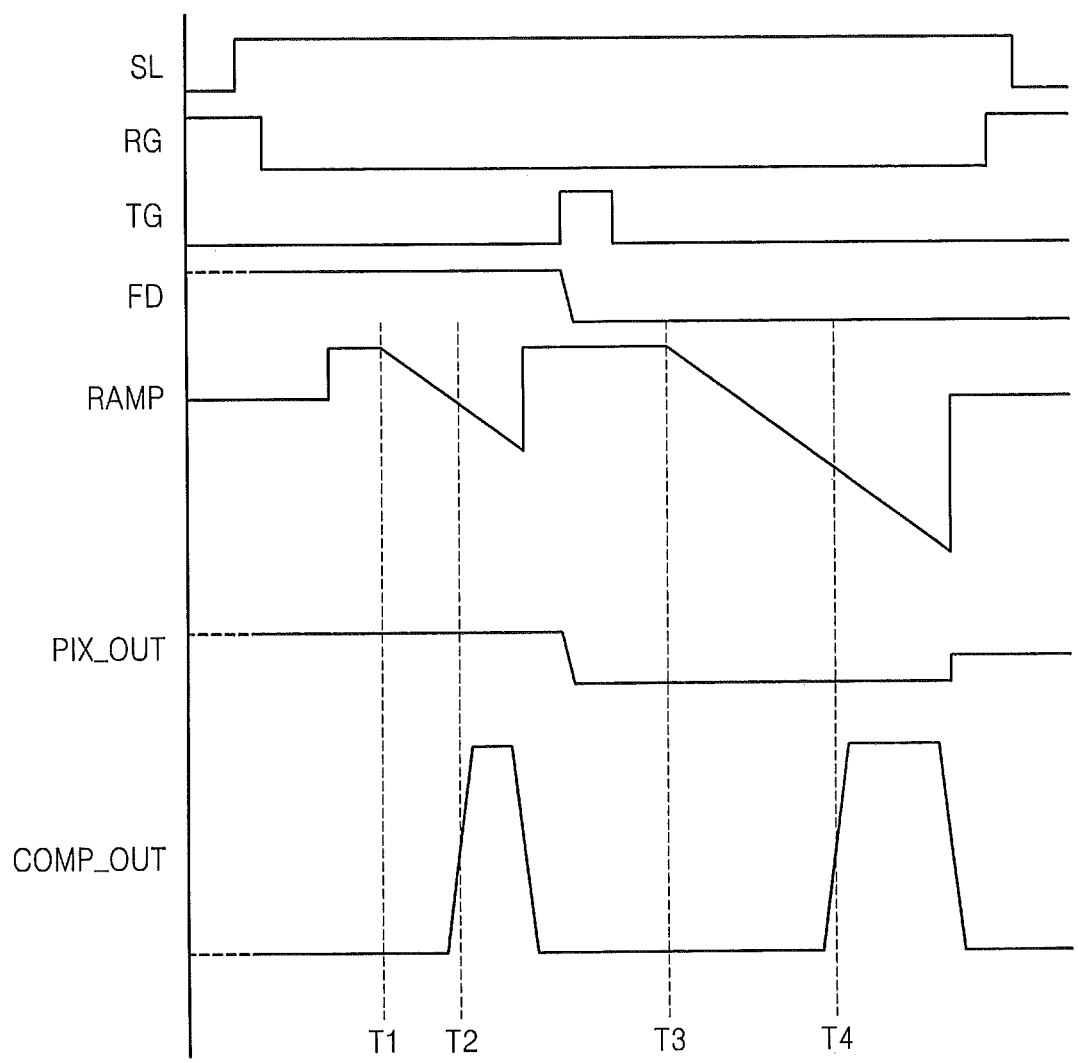
FIG. 11 is a timing diagram of main signals generated by an image sensor, according to an embodiment of the inventive concept.
Figure 12:
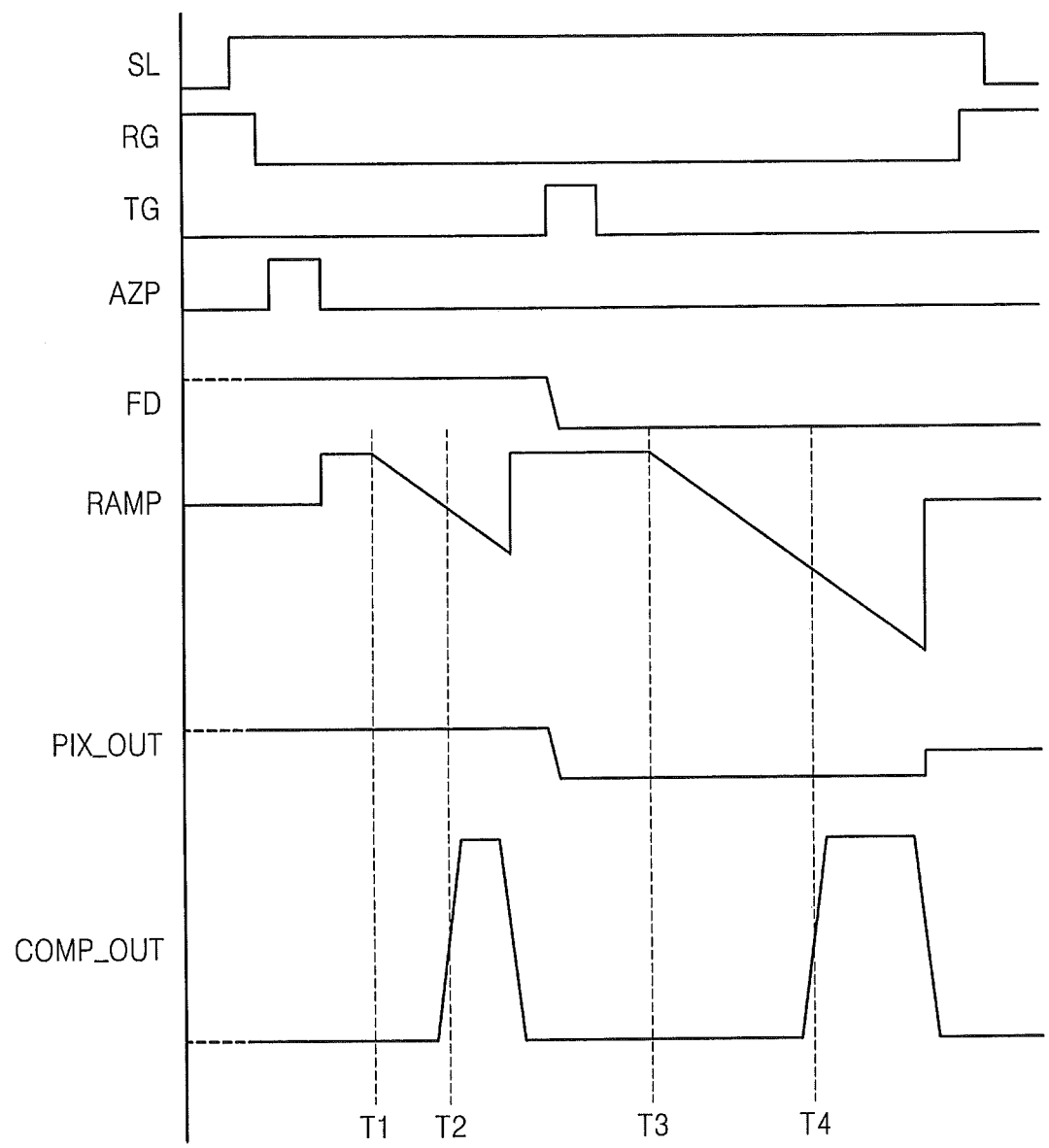
FIG. 12 is a timing diagram of main signals generated by an image sensor, according to another embodiment of the inventive concept.

The ramp signal generator 80 generates a ramp signal RAMP in response to the control signals and outputs the ramp signal RAMP to the comparator circuit block 20. As shown in FIG. 11 or 12, the ramp signal generator 80 generates a signal having one ramp waveform before a pulse of the driving signal TG is generated, and generates a signal having one ramp waveform after the pulse of the driving signal TG is generated so as to perform CDS.

The comparator circuits 21 are respectively connected to the column signal lines 12-1~12-m. Various embodiments of the comparator circuit 21 will be described with reference to FIGS. 3 and 4 below.

Figure 3:
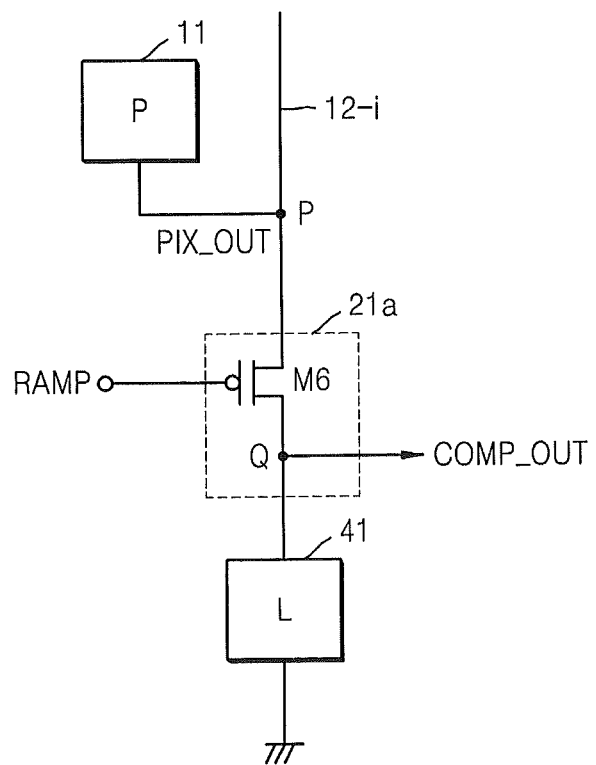
FIG. 3 is a circuit diagram of a comparator circuit connected to one column signal line of a pixel sensor of FIG. 1, according to an embodiment of the inventive concept.

FIG. 3 is a circuit diagram of a comparator circuit 21a connected to one column signal line 12-i of the pixel sensor 11 of FIG. 1, according to an embodiment of the inventive concept.

The image sensor 100 including the comparator circuit 21a of FIG. 3 may generate, for example, the driving signals SL, RG, and TG at the timings of FIG. 11.

Referring to FIG. 3, the comparator circuit 21a may be implemented as a transistor M6. For example, the transistor M6 may be implemented as a PMOS transistor.

The ramp signal RAMP output from the ramp signal generator 80 is applied to a gate terminal of the transistor M6, the column signal line 12-i is connected to a source terminal of the transistor M6, and a first terminal of the load circuit 41 is connected to a drain terminal of the transistor M6. A second terminal of the load circuit 41 is connected to a ground terminal. An output terminal of the pixel sensor 11 is connected to the node P of the column signal line 12-i.

A signal COMP_OUT output from a node Q disposed in a signal line that is connected to the first terminal of the load circuit 41 and the drain terminal of the transistor M6 is applied to the ADC circuit 31.

Referring to FIGS. 2A to 2C, in a case where the transistor M4 is turned on by the driving signal SL applied to the pixel sensors 11a to 11c, an output signal of the source follower transistor M3 is applied to the column signal line 12-i through the node P. The source follower transistor M3 needs a load circuit.

The transistor M6 constituting the comparator circuit 21a also needs a load circuit.

Referring to FIG. 3, the load circuit 41 has a circuit structure in which the load circuit 41 is connected in series to the comparator circuit 21a between the column signal line 12-i and the ground terminal. Accordingly, the load circuit 41 operates as a load device of a pixel sensor connected to the column signal line 12-i, and operates as a load device of the comparator circuit 21a. In other words, the load circuit 41 operates as a common load device of the source follower transistor M3 included in the pixel sensor 11 and the transistor M6 constituting the comparator circuit 21a.

In this regard, the load circuit 41 may be implemented as an active load circuit. An example of the active load circuit is shown in FIG. 9.

Figure 9:
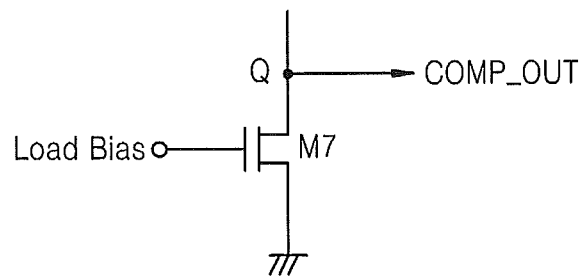
FIG. 9 is a circuit diagram of a load circuit of FIG. 1, according to an embodiment of the inventive concept.

Referring to FIG. 9, an active load circuit 41a may be implemented as a transistor M7. For example, the transistor M7 may be implemented as an NMOS transistor. More specifically, a drain terminal of the transistor M7 is connected to the node Q, a source terminal of the transistor M7 is connected to a ground terminal, and a load bias voltage (or current) is applied to a gate terminal of the transistor M7. A drain-source current of the transistor M7 varies with the load bias voltage (or current). That is, the transistor M7 enables a load value between the node Q and the ground terminal to vary with the load bias voltage (or current). Accordingly, the transistor M7 operates as an active load.

Figure 10:
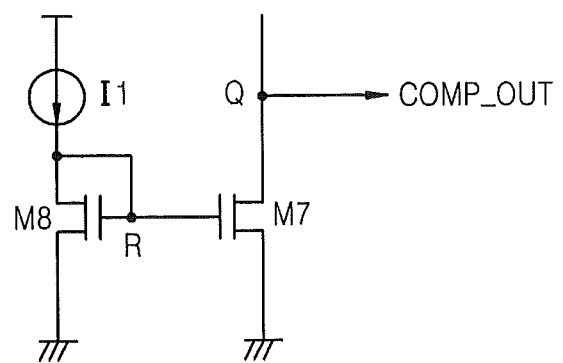
FIG. 10 is a circuit diagram of a load circuit of FIG. 1, according to another embodiment of the inventive concept.

FIG. 10 shows a detailed example of an active load circuit 41b including a circuit for generating a load bias.

Referring to FIG. 10, for example, transistors M7 and M8 may be implemented as NMOS transistors. More specifically, a drain terminal of the transistor M7 is connected to the node Q, a source terminal of the transistor M7 is connected to a ground terminal, and a gate terminal of the transistor M7 is connected to a node R. A gate terminal and a drain terminal of the transistor M8 are connected to the node R, and a source terminal of the transistor M8 is connected to the ground terminal. A first terminal of a current source I1 is connected to a power voltage terminal, and a second terminal thereof is connected to the node R.

A gate-source voltage of the transistor M7 is the same as a gate-source voltage of the transistor M8, and thus a drain-source current of the transistor M7 is the same as a drain-source current of the transistor M8. That is, the transistor M7 operates a current mirror circuit.

Accordingly, the drain-source current of the transistor M7 varies with a variation of a current value of the current source I1. The transistor M7 enables a load value between the node Q and the ground terminal to vary with the current value of the current source I1. Accordingly, the transistor M7 operates as an active load.

Referring to FIG. 3, it is assumed that the pixel sensor 11 is implemented as, for example, the circuit of FIG. 2A, and the driving signals SL, RG, and TG are generated at the timings of FIG. 11. It is also assumed that the ramp signal generator 80 generates the ramp signal RAMP at the timing of FIG. 11.

Then, a voltage of the floating diffusion node FD of FIG. 2A is as shown in FIG. 11. The output signal PIX_OUT of the pixel sensor 11 disposed in the node P of the column signal line 12-i has a waveform shown in FIG. 11.

Referring to FIG. 3, if the ramp signal RAMP shown in FIG. 11 is applied to the gate terminal of the transistor M6 of the comparator circuit M6, the node Q connected to the drain terminal of the transistor M6 generates the output signal COMP_OUT of the comparator circuit 21a. The PMOS transistor M6 is turned on if a voltage applied to the gate terminal of the PMOS transistor M6 is lower than a voltage obtained by subtracting a threshold voltage Vth from a voltage applied to the source terminal thereof, and is turned off if the voltage applied to the gate terminal of the PMOS transistor M6 is not lower than the obtained voltage.

Accordingly, as shown in FIG. 11, the output signal COMP_OUT of the comparator circuit 21a is in a logic high state HIGH in a case where a voltage of the ramp signal RAMP applied to the gate terminal of the transistor M6 is lower than a voltage obtained by subtracting the threshold voltage Vth from a voltage of the pixel signal PIX_OUT applied to the drain terminal of the transistor M6, and is in a logic low state LOW if the voltage of the ramp signal RAMP applied to the gate terminal of the transistor M6 is not lower than the obtained voltage. That is, it may be understood that the transistor M6 operates as a comparator circuit for comparing the ramp signal RAMP with the output signal PIX_OUT of the pixel sensor 11.

The above-described output signal COMP_OUT of the comparator circuit 21a is applied to the ADC circuits 31.

Referring to FIG. 1, the ADC circuits 31 may be implemented as, for example, counter circuits for generating digital data with respect to a corresponding pixel as a counting value corresponding to a difference in a length between double sampling sections determined according to the output signal COMP_OUT of the comparator signal 21 based on a CDS process.

For example, referring to FIG. 11, before a pulse of the driving signal TG is generated, the ramp signal generator 80 starts a up-counting operation at a time T1 at which a signal having a ramp waveform is generated, and stops the up-counting operation at a time T2 at which the output signal COMP_OUT is in a logic high state. After the pulse of the driving signal TG is generated, the ramp signal generator 80 starts a down-counting operation at a time T3 at which the signal having the ramp waveform is generated, and stops the down-counting operation at a time T4 at which the output signal COMP_OUT is in the logic high state. In this way, the digital data may be generated by operating the counter circuits as described above.

For another example, referring to FIG. 11, before the pulse of the driving signal TG is generated, the ramp signal generator 80 starts the down-counting operation at the time T1 at which the signal having the ramp waveform is generated, and stops the down-counting operation at the time T2 at which the output signal COMP_OUT is in the logic high state. After the pulse of the driving signal TG is generated, the ramp signal generator 80 starts the up-counting operation at the time T3 at which the signal having the ramp waveform is generated, and stops the up-counting operation at the time T4 at which the output signal COMP_OUT is in the logic high state. In this way, the digital data may be generated by operating the counter circuits as described above.

For another example, referring to FIG. 11, the digital data may be generated with respect to a corresponding pixel by performing the up- or down-counting operation on the two sampling sections T1-T2 and T3-T4 of the double sampling section, and changing a digital data code of one of the two sampling sections through bit inversion between the two sampling sections.

The counter circuits that implement the ADC circuits 31 may be reset, for example, at a time at which a pulse of the driving signal RF is generated.

Referring to FIG. 1, a plurality of pieces of pixel data generated by the ADC circuits 31 included in the ADC circuit block 30 are stored in the buffer memory block 50.

The pixel data stored in the buffer memory block 50 may be output to an image processor (not shown) under control of the timing controller 60.

Figure 4:
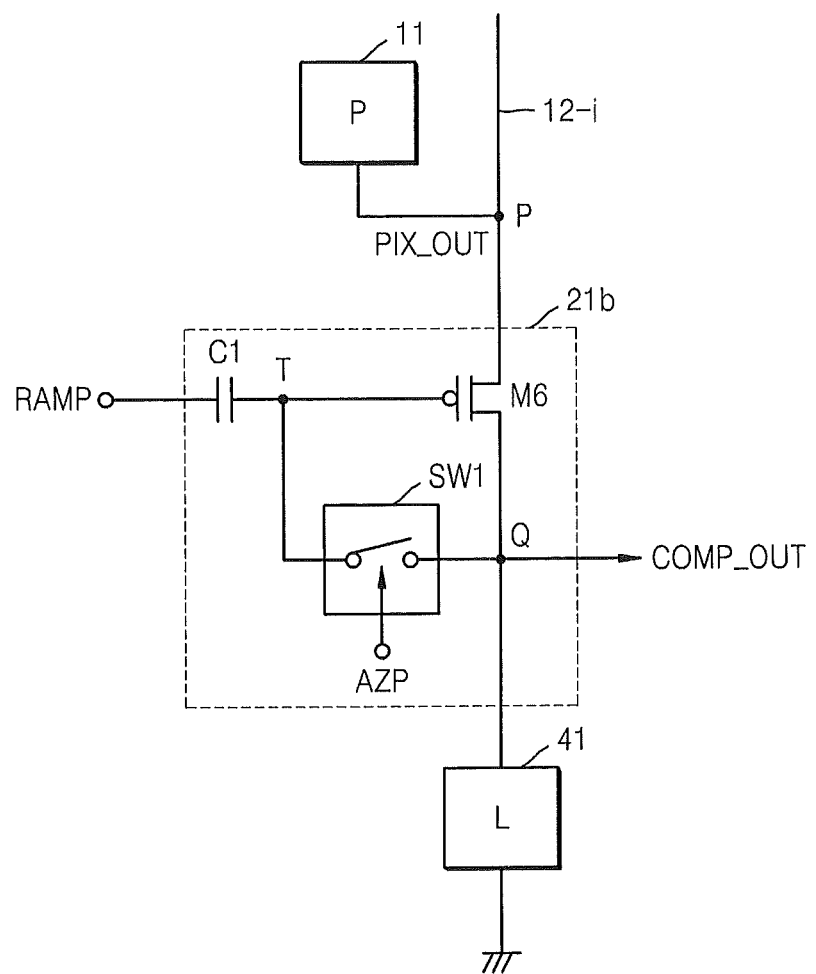
FIG. 4 is a circuit diagram of a comparator circuit connected to one column signal line of a pixel sensor of FIG. 1, according to another embodiment of the inventive concept.

FIG. 4 is a circuit diagram of a comparator circuit 21b connected to the column signal line 12-i of the pixel sensor 11 of FIG. 1, according to another embodiment of the inventive concept.

The image sensor 100 including the comparator circuit 21b of FIG. 4 may generate the driving signals SL, RG, TG, and AZP, for example, at the timing shown in FIG. 12.

Referring to FIG. 4, the comparator circuit 21b may be implemented as the transistor M6, a capacitor C1, and a switch SW1. For example, the transistor M6 may be a PMOS transistor.

The gate terminal of the transistor M6 is connected to a node T, the source terminal of the transistor M6 is connected to the node P of the column signal line 12-i, and the drain terminal of the transistor M6 is connected to the node Q. A first terminal of the switch SW1 is connected to the node T, a second terminal thereof is connected to the node Q, and the driving signal AZP is applied to a control terminal of the switch SW1. A first terminal of the capacitor C1 is connected to the node T, and the ramp signal RAMP output from the ramp signal generator 80 is applied to a second terminal of the capacitor C1. In this regard, the driving signal AZP is generated before, for example, a CDS process is performed. For example, as shown in FIG. 12, before the ramp signal generator 80 generates a signal having a ramp waveform, the row driver 70 may generate the driving signal AZP under control of the timing controller 60.

A first terminal of the load circuit 41 is connected to the node Q, and a second terminal thereof is connected to a ground terminal. An output terminal of the pixel sensor 11 is connected to the node P of the column signal line 12-i.

The pixel sensor 11 connected to the node P may be implemented as, for example, the circuits shown in FIGS. 2A to 2C.

The pixel sensor 11 and the load circuit 41 are described in detail with reference to FIG. 3, and, thus, redundant descriptions thereof will not be repeated here.

As described with reference to FIG. 3, the load circuit 41 of FIG. 4 operates as a common load device of the source follower transistor M3 included in the pixel sensor 11 and the transistor M6 constituting the comparator circuit 21b.

The comparator circuit 21b of FIG. 4 further includes the capacitor C1 and the switch SW1 compared to the comparator circuit 21 of FIG. 3.

Referring to FIG. 4, the capacitor C1 and the switch SW1 function to remove an offset of the transistor M6 constituting the comparator circuit 21b. That is, the switch SW1 is turned on during a section in which the driving signal AZP is in a logic high state HIGH. A voltage reflecting an offset of a threshold voltage of the transistor M6 is applied to both terminals of the capacitor C1 during the section in which the switch SW1 is turned on. Thereafter, if the switch SW1 is turned off, the voltage reflecting the offset of the threshold voltage of the transistor M6 is applied to both terminals of the capacitor C1, and, thus, the offset of the transistor M6 is removed.

Figure 5:
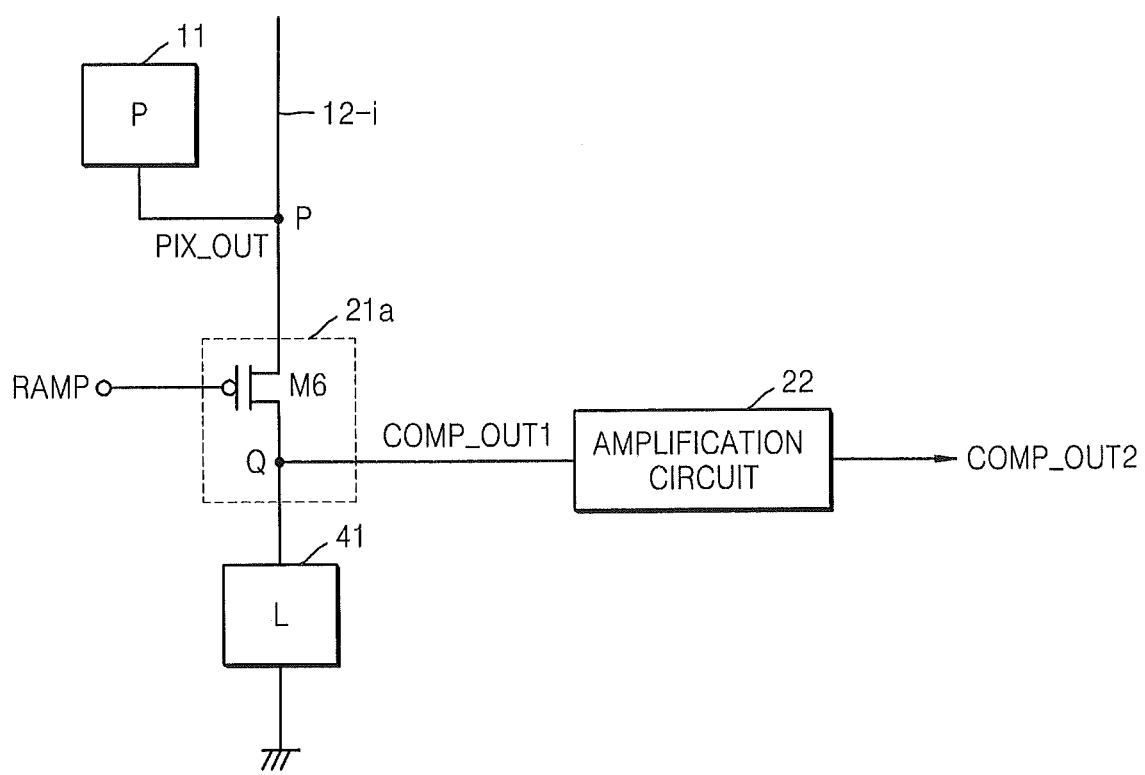
FIG. 5 is a circuit diagram of an amplification circuit added to a comparator circuit connected to one column signal line of the pixel sensor of FIG. 3, according to an embodiment of the inventive concept.

FIG. 5 is a circuit diagram of an amplification circuit 22 added to the comparator circuit 21a connected to one column signal line of the pixel sensor 11 of FIG. 3, according to an embodiment of the inventive concept.

The pixel sensor 11, the comparator circuit 21a, and the load circuit 41 of FIG. 5 are described in detail with reference to FIG. 3, and, thus, redundant descriptions thereof will not be repeated here.

Referring to FIG. 5, an input terminal of the amplification circuit 22 is connected to the node Q corresponding to an output terminal of the comparator circuit 21a, and an output terminal of the amplification circuit 22 is connected to the ADC circuits 31. Accordingly, an output signal COMP_OUT1 of the comparator circuit 21a output to the node Q is amplified by the amplification circuit 22. A signal COMP_OUT2 amplified by the amplification circuit 22 is applied to the ADC circuits 31.

Figure 6A:
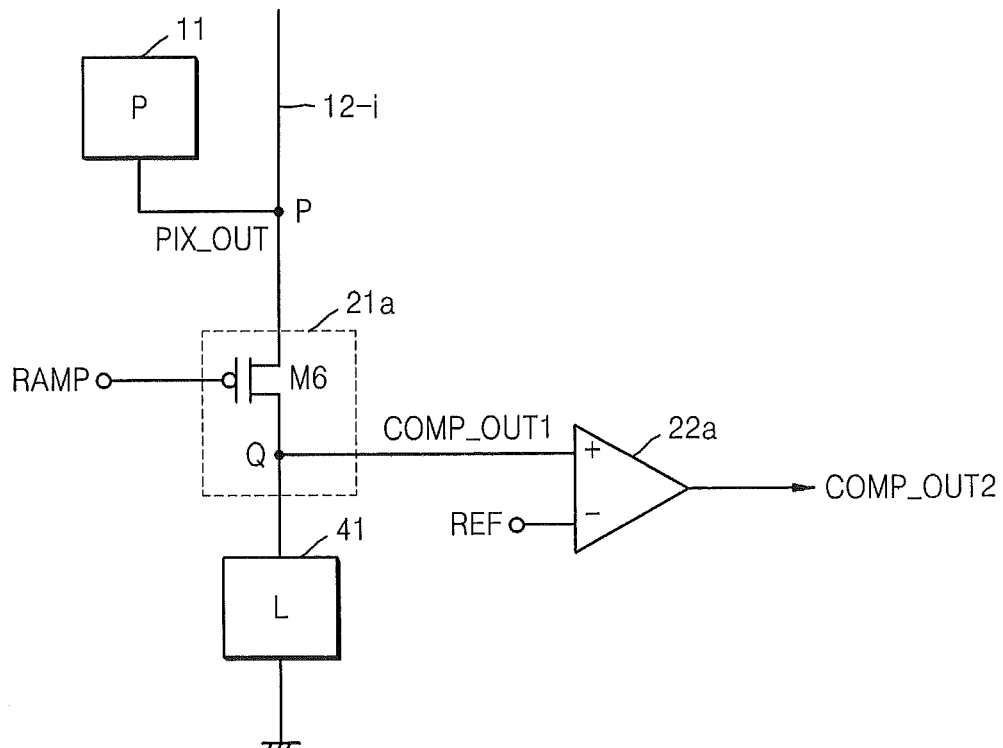
FIGS. 6A and 6B are circuit diagrams of the amplification circuit of FIG. 5, according to embodiments of the inventive concept.
Figure 6B:
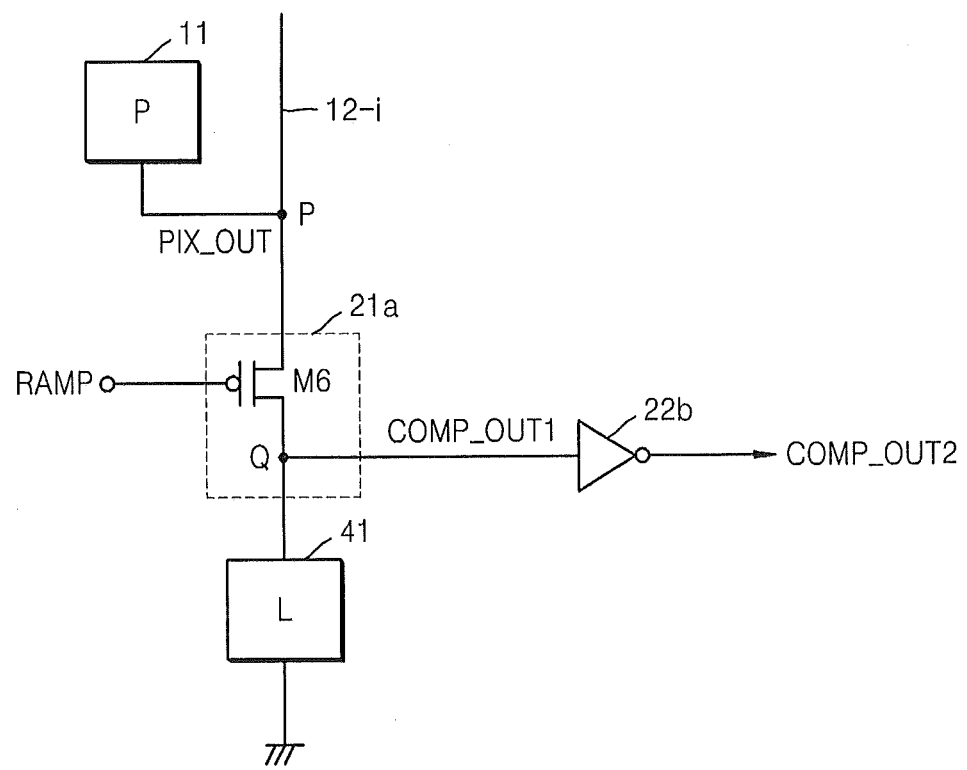

FIGS. 6A and 6B are circuit diagrams of the amplification circuit 22 of FIG. 5, according to embodiments of the inventive concept.

Referring to FIG. 6A, the amplification circuit 22 may be implemented as, for example, an amplifier 22a, such as an operational amplifier OP AMP. A first input terminal of the amplifier 22a is connected to the node Q corresponding to the output terminal of the comparator circuit 21a, and a reference voltage REF is applied to a second input terminal of the amplifier 22a. For example, the first input terminal of the amplifier 22a is set as a positive terminal +, and the second input terminal of the amplifier 22a may be set as a negative terminal –. For another example, the first input terminal of the amplifier 22a is set as the negative terminal –, and the second input terminal of the amplifier 22a may be set as the positive terminal +. The output terminal of the amplifier 22a is connected to the ADC circuits 31.

Referring to FIG. 6B, the amplification circuit 22 may be implemented as, for example, an inverter 22b. An input terminal of the inverter 22b is connected to the node Q corresponding to the output terminal of the comparator circuit 21a, and an output terminal of the inverter 22b is connected to the ADC circuits 31.

Figure 7:
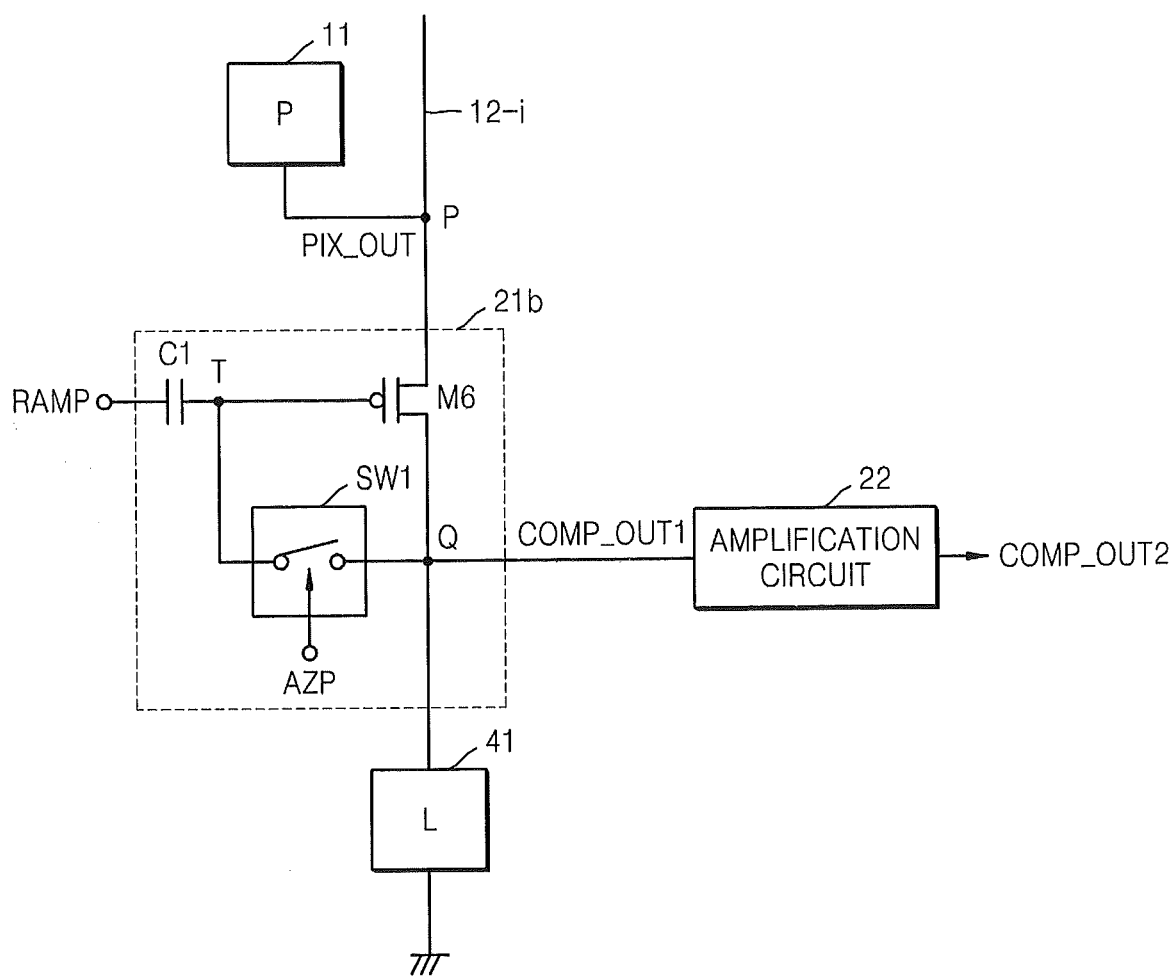
FIG. 7 is a circuit diagram of an amplification circuit added to a comparator circuit connected to one column signal line of the pixel sensor of FIG. 4, according to another embodiment of the inventive concept.

FIG. 7 is a circuit diagram of the amplification circuit 22 added to the comparator circuit 21b connected to one column signal line of the pixel sensor 11 of FIG. 4, according to another embodiment of the inventive concept.

The pixel sensor 11, the comparator circuit 21b, and the load circuit 41 of FIG. 7 are described in detail with reference to FIG. 4, and, thus, redundant descriptions thereof will not be repeated here.

Referring to FIG. 7, an input terminal of the amplification circuit 22 is connected to the node Q corresponding to an output terminal of the comparator circuit 21b, and an output terminal of the amplification circuit 22 is connected to the ADC circuits 31. Accordingly, the output signal COMP_OUT1 of the comparator circuit 21b output to the node Q is amplified by the amplification circuit 22. The signal COMP_OUT2 amplified by the amplification circuit 22 is applied to the ADC circuits 31.

Figure 8A:
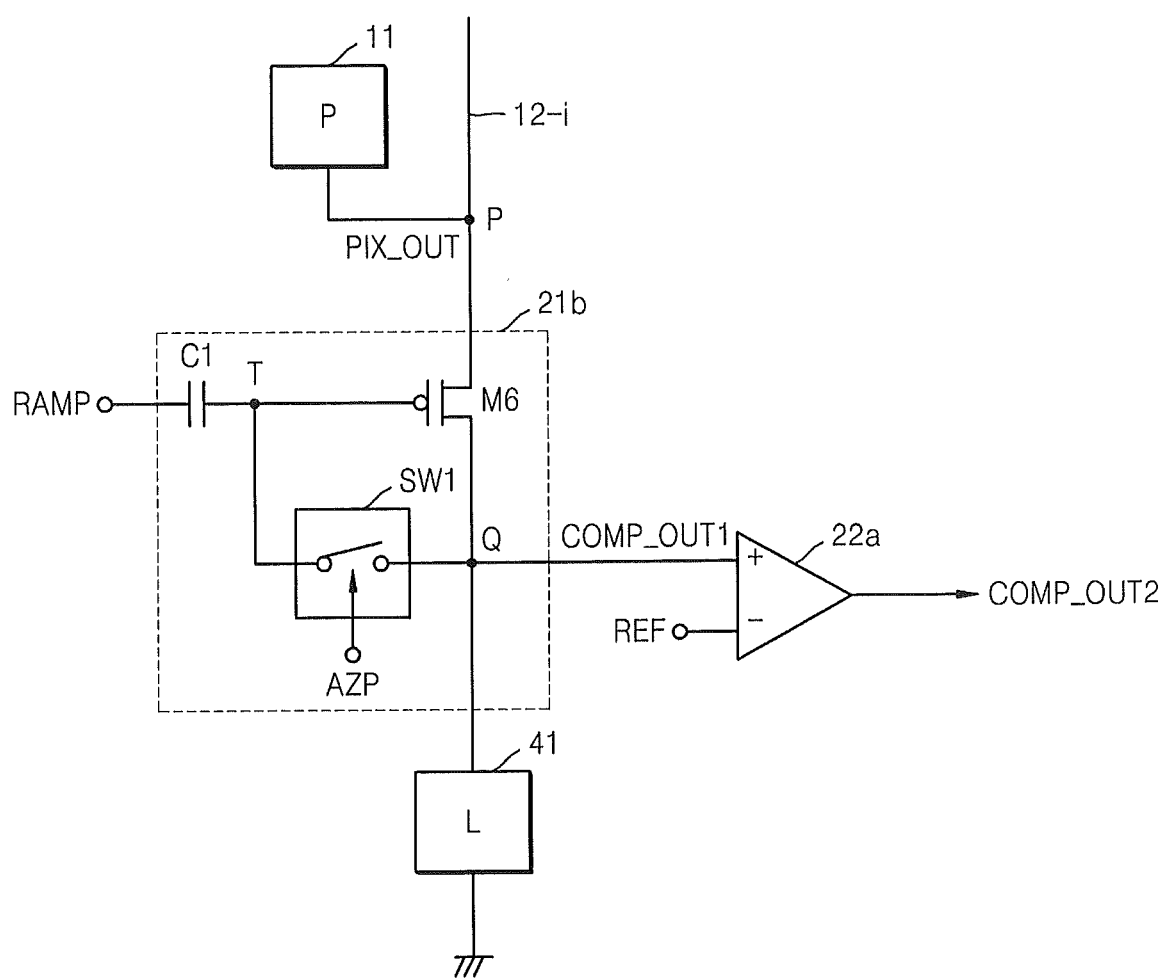
FIGS. 8A and 8B are circuit diagrams of the amplification circuit of FIG. 7, according to embodiments of the inventive concept.
Figure 8B:
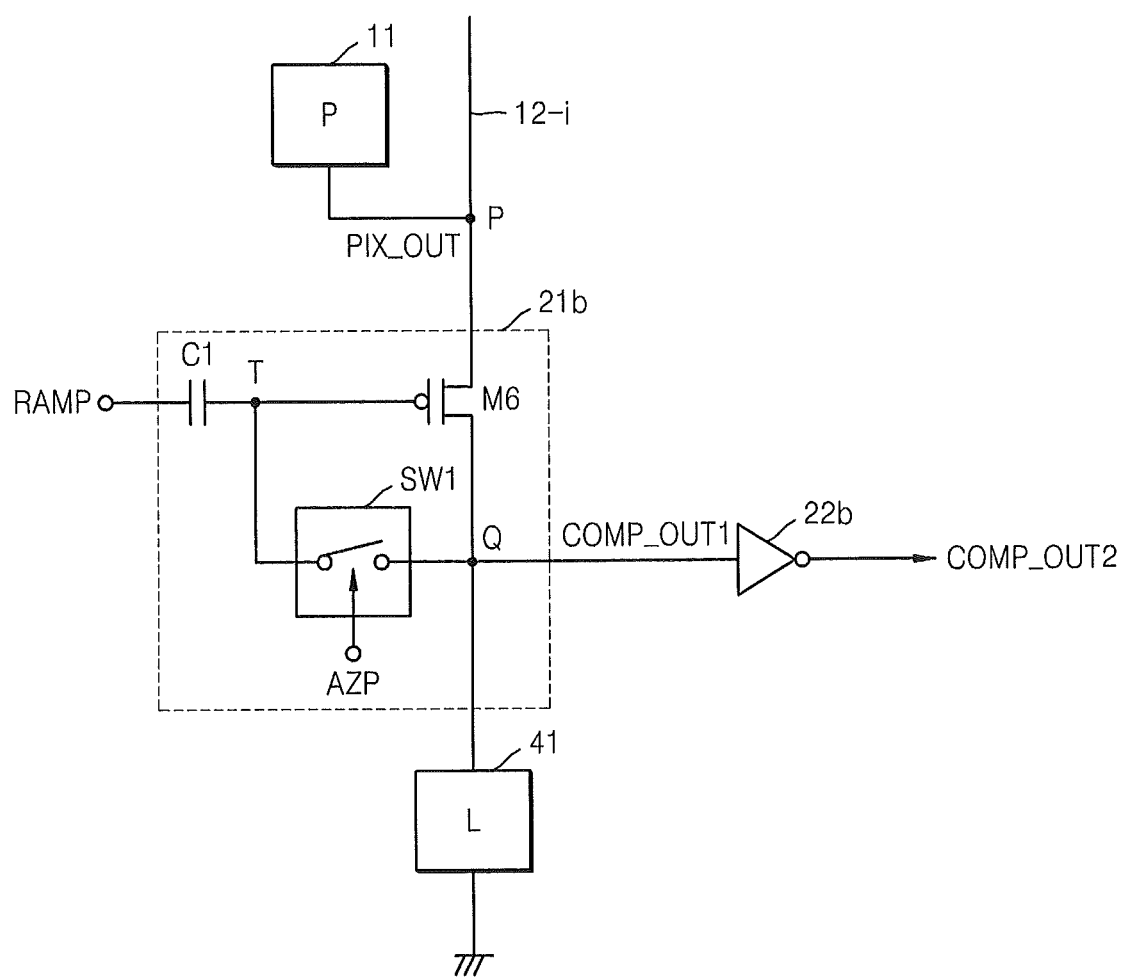

FIGS. 8A and 8B are circuit diagrams of the amplification circuit of FIG. 7, according to embodiments of the inventive concept.

Referring to FIG. 8A, the amplification circuit 22 may be implemented as, for example, the amplifier 22a, such as the operational amplifier OP AMP. A first input terminal of the amplifier 22a is connected to the node Q corresponding to the output terminal of the comparator circuit 21b, and the reference voltage REF is applied to a second input terminal of the amplifier 22a. For example, the first input terminal of the amplifier 22a is set as a positive terminal +, and the second input terminal of the amplifier 22a may be set as a negative terminal –. For another example, the first input terminal of the amplifier 22a is set as the negative terminal –, and the second input terminal of the amplifier 22a may be set as the positive terminal +. The output terminal of the amplifier 22a is connected to the ADC circuits 31.

Referring to FIG. 8B, the amplification circuit 22 may be implemented as, for example, the inverter 22b. An input terminal of the inverter 22b is connected to the node Q corresponding to the output terminal of the comparator circuit 21b, and an output terminal of the inverter 22b is connected to the ADC circuits 31.

Figure 13:
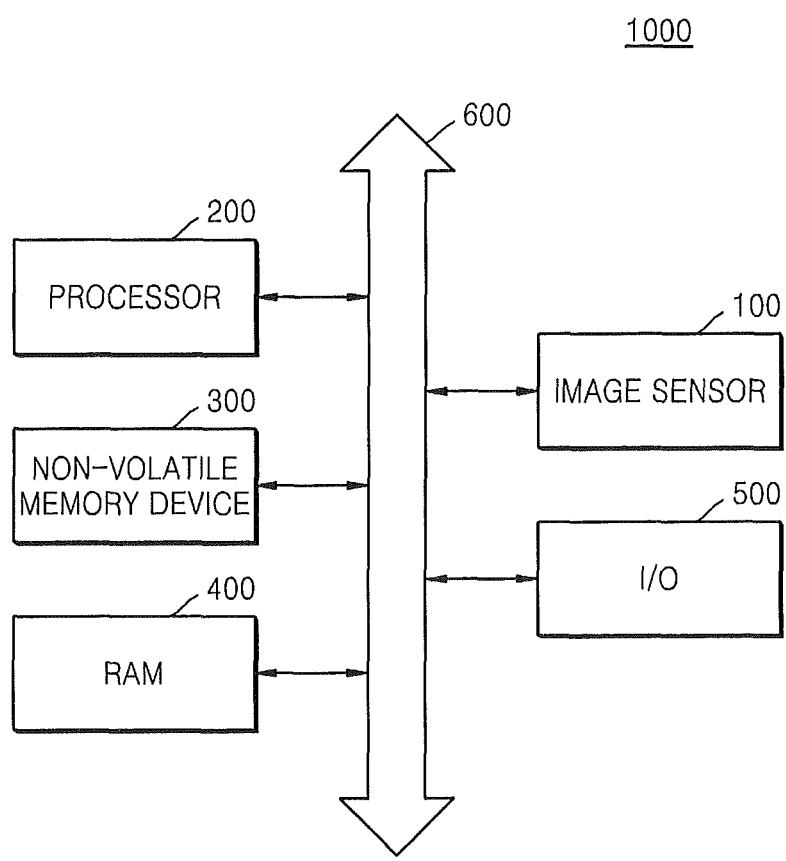
FIG. 13 is a block diagram of an image processing apparatus according to embodiments of the inventive concept.

FIG. 13 is a block diagram of an image processing apparatus 1000 according to embodiments of the inventive concept. For example, the image processing apparatus 1000 may be included in a computer apparatus, a camera apparatus, a cellular phone apparatus, a scanner apparatus, a navigation apparatus, a security system, and the like.

Referring to FIG. 13, the image processing apparatus 1000 may include the image sensor 100, a processor 200, a non-volatile memory device 300, a random access memory (RAM) 400, an input/output device I/O 500, and a bus 600.

The image sensor 100 of FIG. 1 may be applied to the image sensor 100 of FIG. 13. The embodiments of the image sensor 100 of FIGS. 2 through 10 may be applied to the image sensor 100 of FIG. 13.

The processor 200 controls an operation of the image sensor 100 and performs signal post-processing on a signal output from the image sensor 100. The processor 200 may transmit or receive data to or from elements connected through the bus 600.

The non-volatile memory device 300 may store image data on which post-processing is performed by the processor 200 or a program and data necessary for controlling the image processing apparatus 1000. The non-volatile memory device 300 may be implemented as a non-volatile semiconductor memory device, for example, phase change RAM (PRAM), ferroelectric RAM (FRAM), magnetic RAM (MRAM), and the like.

The RAM 400 may temporarily store data used in the image processing apparatus 1000.

An input device included in the input/output device 500 may be implemented as a keyboard, a mouse, a keypad, and the like, and an output device included therein may be implemented as a display, a printer, and the like.

While the inventive concept has been particularly shown and described with reference to exemplary embodiments thereof, it will be understood that various changes in form and details may be made therein without departing from the spirit and scope of the following claims.

What is claimed is:

1. An image sensor comprising:
   a column signal line connected to output terminals of a plurality of pixel sensors;
   a comparator circuit configured to output a signal corresponding to a comparison result of a signal output to the column signal line and a reference signal at an output terminal thereof;
   an analog/digital conversion (ADC) circuit configured to convert an analog signal corresponding to an optical signal sensed by the pixel sensor selected from the plurality of pixel sensors connected to the column signal line into digital data based on the signal output from the comparator circuit; and
   a load circuit directly connected in series to the comparator circuit between the output terminal of the comparator circuit and a ground terminal, such that the comparator circuit is connected between the load circuit and the column signal line, wherein the load circuit is configured as a common load device of the plurality of pixel sensors connected to the column signal line and the comparator circuit;
   wherein the comparator circuit comprises a transistor,
   wherein the reference signal is applied to a gate terminal of the transistor, the column signal line is connected to a first terminal of the transistor, and the load circuit is connected to a second terminal of the transistor.

2. The image sensor of claim 1, wherein the transistor comprises a PMOS transistor.

3. The image sensor of claim 1, wherein the comparator circuit further comprises a capacitor and a switch,
   wherein the reference signal is applied to a first terminal of the capacitor, the gate terminal of the transistor and a first terminal of the switch are connected to a second terminal of the capacitor such that the reference signal is applied to the gate terminal of the transistor through the capacitor, and a second terminal of the switch is connected to the second terminal of the transistor.

4. The image sensor of claim 3, wherein the switch is in a turned on state during a first section before a correlated double sampling (CDS) process is performed and is in a turned off state during sections other than the first section.

5. The image sensor of claim 1, wherein the load circuit comprises an active load circuit.

6. The image sensor of claim 1, wherein the reference signal comprises a signal having a ramp waveform.

7. The image sensor of claim 1, wherein the ADC circuit comprises: a counter circuit configured to generate the digital data as a counting value corresponding to a difference in a length of double sampling sections determined according to the signal output from the comparator circuit based on a correlated double sampling (CDS) process.

8. The image sensor of claim 7, wherein the counter circuit is configured to generate the digital data by performing up-counting during one of the double sampling sections and performing down-counting during another double sampling section, or performing up-counting or down-counting during the double sampling sections and changing a digital data code of one of the double sampling sections through bit-inversion between the double sampling sections.

9. The image sensor of claim 1, further comprising an amplification circuit between an output terminal of the comparator circuit and the ADC circuit.

10. The image sensor of claim 9, wherein the amplification circuit comprises an inverter or an amplifier.

11. The image sensor of claim 1, wherein each of the plurality of pixel sensors comprises:
    a photoelectric conversion device configured to generate charges corresponding to an incident light; and
    a signal transfer circuit configured to transfer an electrical signal corresponding to the charges generated by the photoelectric conversion device to the column signal line.

12. The image sensor of claim 11, wherein the signal transfer circuit comprises:
    a first transistor connected between the photoelectric conversion device and the first node and configured to transmit the charges accumulated in the photoelectric conversion device to the first node according to a first driving signal;
    a second transistor connected between the first node and a power voltage and configured to reset the charges charged in the first node according to a second driving signal;

a third transistor connected between the first node and a second node and configured to transfer a signal sensed by the first node to the second node; and a fourth transistor connected between the second node and the column signal line and configured to transfer a signal of the second node to the column signal line according to a third driving signal.

13. An image processing apparatus comprising:

an image sensor configured to convert an incident image signal into an electrical signal; and a processor configured to control an operation of the image sensor and post-processing a signal output from the image sensor, wherein the image sensor comprises:

a column signal line connected to output terminals of a plurality of pixel sensors;

a comparator circuit configured to output a signal corresponding to a comparison result of a signal output to the column signal line and a reference signal at an output terminal thereof;

an analog/digital conversion (ADC) circuit configured to convert an analog signal corresponding to an optical signal sensed by the pixel sensor selected from the plurality of pixel sensors connected to the column signal line into digital data based on the signal output from the comparator circuit; and a load circuit directly connected in series to the comparator circuit between the output terminal of the comparator circuit and a ground terminal, such that the comparator circuit is connected between the load circuit and the column signal line, wherein the load circuit is configured as a common load device of the plurality of pixel sensors connected to the column signal line and the comparator circuit;

wherein the comparator circuit comprises a transistor, wherein the reference signal comprises a ramp waveform and is applied to a gate terminal of the transistor, the column signal line is connected to a first terminal of the transistor, and the load circuit is connected to a second terminal of the transistor.

14. An image sensor, comprising:

a column signal line connected to output terminals of a plurality of pixel sensors and configured to generate a column signal line output signal;

a comparator circuit configured to output a comparison result signal corresponding to a comparison of the column signal line output signal and a reference signal at an output terminal thereof;

a load circuit directly connected to the comparator circuit between the output terminal of the comparator circuit and a ground terminal and configured as a common load device of the plurality of pixel sensors connected to the column signal line and the comparator circuit, wherein the comparator circuit is connected between the load circuit and the column signal line;

wherein the comparator circuit comprises a transistor, a gate terminal of the transistor receives the reference signal, the column signal line is connected to a first terminal of the transistor, and the load circuit is connected to a second terminal of the transistor.

15. The image sensor of claim 14, wherein the transistor comprises a PMOS transistor.

16. The image sensor of claim 14, wherein the comparator circuit further comprises a capacitor and a switch, a first terminal of the capacitor receives the reference signal, the gate terminal of the transistor and a first terminal of the switch are connected to a second terminal of the capacitor such that the gate terminal of the transistor receives the reference signal through the capacitor, and a second terminal of the switch is connected to the second terminal of the transistor.

17. The image sensor of claim 16, wherein the switch is in a turned on state during a first section before a correlated double sampling (CDS) process is performed and is in a turned off during sections other than the first section.

* * * * *